United States Patent
Haruyama

(10) Patent No.: US 11,506,942 B2
(45) Date of Patent: Nov. 22, 2022

(54) ELECTRO-OPTICAL DEVICE AND ELECTRONIC APPARATUS

(71) Applicant: SEIKO EPSON CORPORATION, Tokyo (JP)

(72) Inventor: Akihide Haruyama, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/483,825

(22) Filed: Sep. 24, 2021

(65) Prior Publication Data
US 2022/0100018 A1    Mar. 31, 2022

(30) Foreign Application Priority Data
Sep. 25, 2020  (JP) .............................. JP2020-160935

(51) Int. Cl.
*G02F 1/1339*   (2006.01)
*G02F 1/1335*   (2006.01)
*G02F 1/1343*   (2006.01)

(52) U.S. Cl.
CPC ...... *G02F 1/13398* (2021.01); *G02F 1/13394* (2013.01); *G02F 1/133512* (2013.01); *G02F 1/133526* (2013.01); *G02F 1/134309* (2013.01)

(58) Field of Classification Search
None
See application file for complete search history.

(56) References Cited

U.S. PATENT DOCUMENTS

| 2007/0146568 A1* | 6/2007 | Yamazaki | ............. G02F 1/1337 349/43 |
| 2015/0268512 A1* | 9/2015 | Kwon | ............... G02F 1/133371 349/2 |
| 2021/0072581 A1* | 3/2021 | Ito | ......................... G06F 1/1637 |

FOREIGN PATENT DOCUMENTS

| JP | H05297382 | 11/1993 |
| JP | 2001272670 | 10/2001 |
| JP | 2011064849 | 3/2011 |
| JP | 2016090698 | 5/2016 |

* cited by examiner

*Primary Examiner* — Phu Vu
(74) *Attorney, Agent, or Firm* — JCIPRNET

(57) ABSTRACT

An electro-optical device includes a first substrate including a plurality of pixel electrodes, a second substrate having translucency, an electro-optical layer disposed between the first substrate and the second substrate, the electro-optical layer having an optical property that varies in accordance with an electric field generated by the plurality of pixel electrodes, and a spacer disposed between the first substrate and the second substrate, the spacer including a high refractive index portion having a refractive index greater than a refractive index of the electro-optical layer, the spacer being configured to define a distance between the first substrate and the second substrate.

6 Claims, 8 Drawing Sheets

ELECTRO-OPTICAL DEVICE AND ELECTRONIC APPARATUS

The present application is based on, and claims priority from JP Application Serial Number 2020-160935, filed Sep. 25, 2020, the disclosure of which is hereby incorporated by reference herein in its entirety.

BACKGROUND

1. Technical Field

The present disclosure relates to an electro-optical device and an electronic apparatus.

2. Related Art

An electro-optical device such as a liquid crystal display device capable of changing an optical property for each pixel is used for an electronic apparatus such as a projector, for example.

A liquid crystal display device described in JP-A-2016-90698 includes a first substrate, a second substrate, and a liquid crystal layer disposed between the first substrate and the second substrate. A pixel electrode is provided at the first substrate, and an oriented film is provided at the pixel electrode. A counter electrode is provided at the second substrate, and another oriented film is provided at the counter electrode.

Further, in the liquid crystal display device described in JP-A-2016-90698, a spacer is disposed between the first substrate and the second substrate.

When forming the oriented film after forming the spacer, a periphery of the spacer becomes a shadow of the spacer, which results in a region where the oriented film cannot be formed. Therefore, a method of forming an oriented film by multiple vapor deposition is adopted. However, since a vicinity of a vapor deposition film in the spacer side region is different from the region in which a spacer portion is absent, orientation of liquid crystal molecules in the spacer side region is not sufficient. Thus, the orientation of the liquid crystal is easily disordered around the spacer. As a result, there is a risk that light leakage may occur at a location where the orientation is disordered. In addition, depending on a configuration of the spacer, light incident on the location where the orientation is disordered may be reflected at an interface between the spacer and the liquid crystal. As a result, there is a risk of promoting light leakage. Therefore, there is a problem in that image quality deteriorates due to the effect of the spacer, etc.

SUMMARY

An aspect of an electro-optical device according to the present disclosure includes a first substrate including a plurality of pixel electrodes, a second substrate having translucency, an electro-optical layer disposed between the first substrate and the second substrate, the electro-optical layer having an optical property that varies in accordance with an electric field generated by the plurality of pixel electrodes, and a spacer disposed between the first substrate and the second substrate, the spacer including a high refractive index portion having a refractive index greater than a refractive index of the electro-optical layer, the spacer being configured to define a distance between the first substrate and the second substrate.

An aspect of an electronic apparatus includes the electro-optical device described above, and a control unit configured to control operation of the electro-optical device.

DESCRIPTION OF EXEMPLARY EMBODIMENTS

Figure 1:
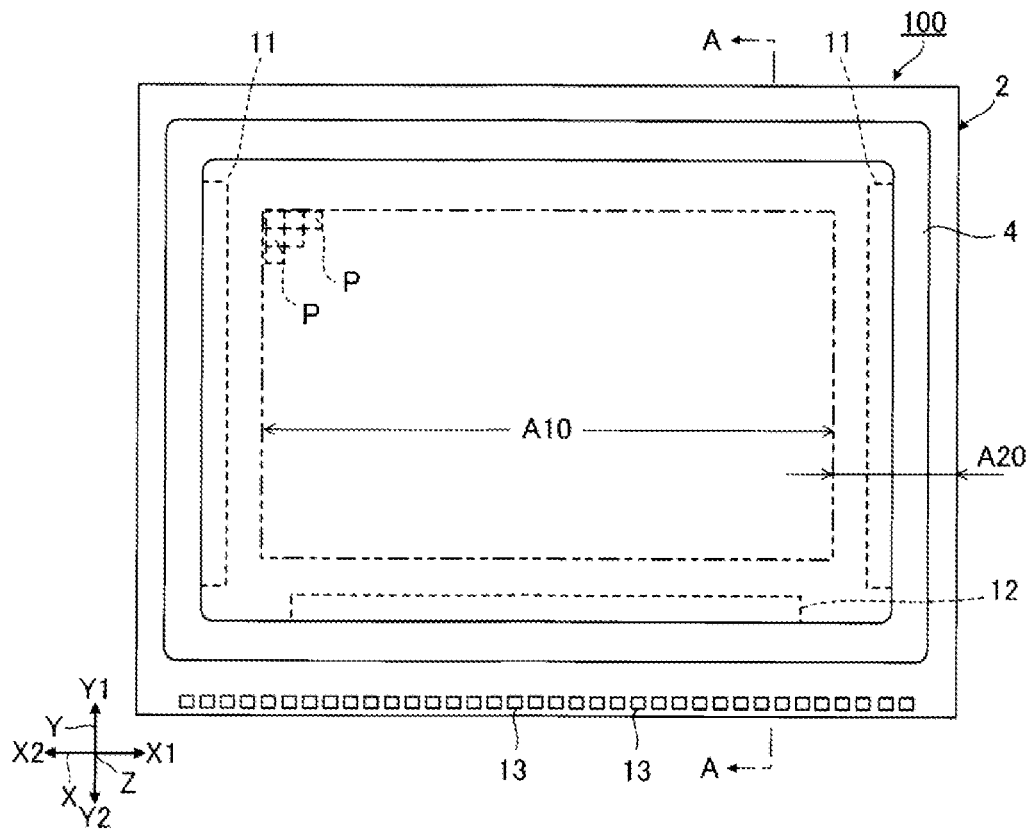
FIG. 1 is a plan view of an electro-optical device according to a first exemplary embodiment.

Preferred embodiments of the present disclosure will be described below with reference to the accompanying drawings. Note that, in the drawings, dimensions and scales of sections are differed from actual dimensions and scales as appropriate, and some of the sections are schematically illustrated to make them easily recognizable. Further, the scope of the present disclosure is not limited to these embodiments unless otherwise stated to limit the present disclosure in the following descriptions.

Figure 2:
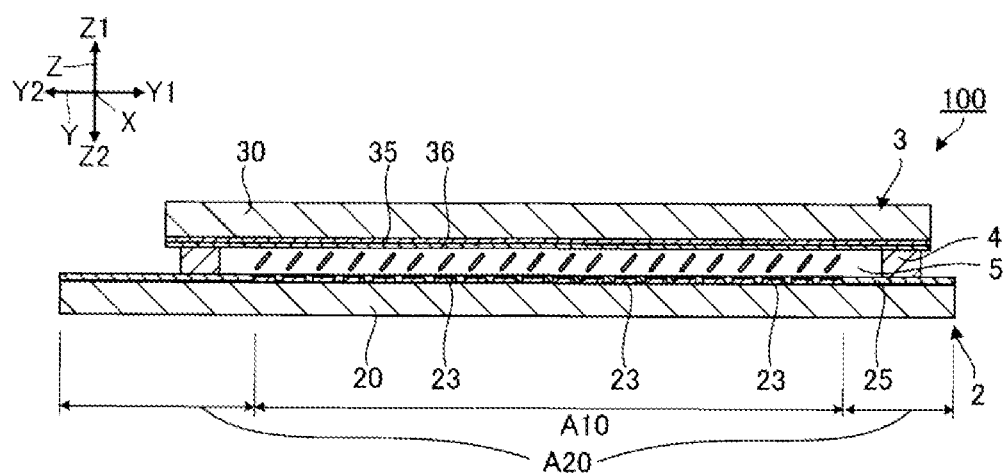
FIG. 2 is a cross-sectional view taken along a line A-A of the electro-optical device illustrated in FIG. 1.

1. Electro-Optical Apparatus
1A. First Exemplary Embodiment
1Aa. Basic Configuration FIG. 1 is a plan view of an electro-optical device 100 according to a first exemplary embodiment. FIG. 2 is a cross-sectional view taken along a line A-A of the electro-optical device 100 illustrated in FIG. 1. Note that in FIG. 1, an illustration of a counter substrate 3 is omitted. Note that, for convenience of explanation, the description will be made appropriately using an X-axis, a Y-axis, and a Z-axis orthogonal to each other. In addition, one direction along the X-axis is designated as an X1 direction, and the direction opposite the X1 direction is designated as an X2 direction. Similarly, one direction along the Y-axis is designated as a Y1 direction, and the direction opposite the Y1 direction is designated as a Y2 direction. The direction along the Z-axis is designated a Z1 direction, and the direction opposite the Z1 direction is designated as a Z2 direction. Additionally, in the following, viewing in the +Z direction or the −Z direction is referred to as "plan view", and viewing from a direction perpendicular to a cross section including the Z-axis is referred to as "cross-sectional view".

The electro-optical device 100 illustrated in FIGS. 1 and 2 is a transmissive liquid crystal device in an active matrix driving method. As illustrated in FIG. 2, the electro-optical device 100 includes an element substrate 2 having translucency, an counter substrate 3 having translucency, a sealing member 4 having a frame shape, and a liquid crystal layer 5. The element substrate 2, the liquid crystal layer 5, and the counter substrate 3 are arranged in this order in the Z1 direction. Also, although not illustrated in FIGS. 1 and 2, the electro-optical device 100 includes a plurality of spacers that define the thickness of the liquid crystal layer 5. In addition, a shape of the electro-optical device 100 illustrated in FIG. 1 in plan view is square, but may be, for example, circular. In the following description, the "translucency" refers to transparency to visible light, and means that a transmittance of visible light is greater than or equal to 50%.

The element substrate 2 illustrated in FIG. 2 is a substrate having a plurality of TFTs (Thin Film Transistors) described below. The element substrate 2 includes a first substrate 20 having translucency, a plurality of pixel electrodes 23 having translucency, and a first oriented film 25 having translucency. Also, although not illustrated, the element substrate 2 includes a plurality of dummy pixel electrodes that surround the plurality of pixel electrodes 23 in plan view.

The counter substrate 3 is a substrate disposed facing the element substrate 2. The counter substrate 3 includes a second substrate 30 having translucency, a common electrode 35 having translucency, and a second oriented film 36 having translucency. The common electrode 35 is a counter electrode disposed at the plurality of pixel electrodes 23 via the liquid crystal layer 5. Also, although not illustrated, the counter substrate 3 has a parting with light shielding properties that surrounds the plurality of pixel electrodes 23 in plan view. The "light shielding" refers to a light shielding property to visible light, and preferably means that a transmittance of visible light is less than 50% and more preferably 10% or less.

Each of the pixel electrodes 23 and the common electrode 35 is an electrode for applying an electric field to the liquid crystal layer 5. Next, detailed configurations of the element substrate 2 and the counter substrate 3 will be described.

The sealing member 4 is disposed between the element substrate 2 and the counter substrate 3. The sealing member 4 is formed using an adhesive containing various types of curable resins such as epoxy resin, for example. The sealing member 4 may include a gap material made from an inorganic material such as glass. Although it is also possible for the gap material to control a distance between the first substrate 20 and the second substrate 30, the distance between the first substrate 20 and the second substrate 30 can be controlled by disposing a spacer 6 described below in a display region A10. The spacer 6 is not illustrated in FIGS. 1, 2, but illustrated in FIG. 4 and subsequent drawings.

The liquid crystal layer 5 is disposed in a region surrounded by the element substrate 2, the counter substrate 3, and the sealing member 4. The liquid crystal layer 5 is disposed between the first substrate 20 and the second substrate 30, and is an electro-optical layer having an optical property that varies in accordance with the electric field. The liquid crystal layer 5 contains liquid crystal molecules having positive or negative dielectric anisotropy. The orientation of the liquid crystal molecules varies in accordance with the voltage applied to the liquid crystal layer 5.

As illustrated in FIG. 1, a plurality of scanning line drive circuits 11, a signal line driving circuit 12, and a plurality of external terminals 13 are disposed at the element substrate 2. A portion of the plurality of external terminals 13, although not illustrated, is coupled to wiring drawn from the scanning line drive circuits 11 or the signal line driving circuit 12. Furthermore, the plurality of external terminals 13 include terminals to which a common potential is applied. The terminals are electrically coupled to the common electrode 35 of the counter substrate 3 via wiring and a conductive material (not illustrated).

The electro-optical device 100 includes the display region A10 that displays an image, and a peripheral region A20 located outside the display region A10 in plan view. The display region A10 includes a plurality of pixels P arranged in a matrix pattern. The plurality of pixel electrodes 23 are disposed in a one-to-one manner with respect to the plurality of pixels P. The common electrode 35 described above is provided in common with the plurality of pixels P. Also, the peripheral region A20 surrounds the display region A10 in plan view. The scanning line drive circuits 11 and the signal line driving circuit 12 are disposed in the peripheral region A20. Also, although not illustrated, the peripheral region A20 includes a dummy pixel region in which the plurality of dummy pixel electrodes are disposed.

In the present exemplary embodiment, the electro-optical device 100 is transmissive. In the present exemplary embodiment, the image is displayed by modulating the light incident on the counter substrate 3 while the light is emitted from the element substrate 2. Note that the image may be displayed by modulating the light incident on the element substrate 2 while the light is emitted from the counter substrate 3. The electro-optical device 100 may also be reflective. In this case, for example, the common electrode 35 has translucency and the pixel electrodes 23 are reflective. In the case of being reflective, the light incident on the counter substrate 3 is reflected by the pixel electrodes 23 and is again modulated while being emitted from the counter substrate 3, thereby the image is displayed. Furthermore, in the case of being reflective, the element substrate 2 may not have translucency, and may be, for example, a silicon substrate at which elements, etc. can be created.

Furthermore, the electro-optical device 100 is applied to a display device that performs color display, such as a personal computer and a smartphone described below. When applied to the display device, a color filter is appropriately used for the electro-optical device 100. The electro-optical device 100 is applied to a projection-type projector described below, for example. In this case, the electro-optical device 100 functions as a light valve. Note that in this case, the color filter is omitted from the electro-optical device 100.

1Ab. Electrical Configuration of Element Substrate 2

Figure 3:
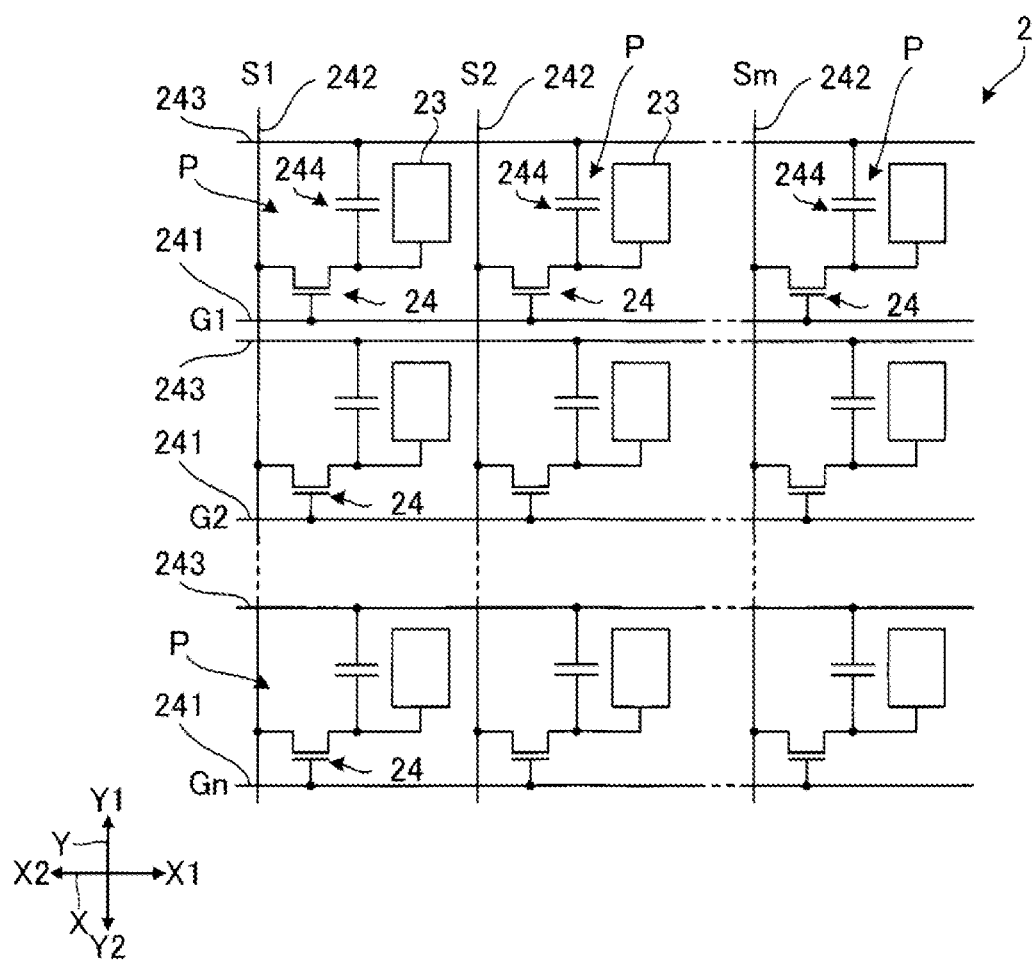
FIG. 3 is an equivalent circuit diagram illustrating an electrical configuration of an element substrate of FIG. 1.

FIG. 3 is an equivalent circuit diagram illustrating an electrical configuration of an element substrate 2 of FIG. 1. As illustrated in FIG. 3, the element substrate 2 includes a plurality of transistors 24, n scanning lines 241, m signal lines 242, and n capacitor lines 243. Note that n and m are integers of 2 or greater, respectively. The transistors 24 are disposed corresponding to each intersection between the n scanning lines 241 and the m signal lines 242. Each transistor 24 is a TFT that functions as a switching element, for example. Each transistor 24 includes a gate, a source, and a drain.

Each of the n scanning lines 241 extends in the X1 direction, and the n scanning lines 241 are arranged at equal intervals in the Y2 direction. The n scanning lines 241 are each electrically coupled to the gates of the corresponding plurality of transistors 24. The n scanning lines 241 are electrically coupled to the scanning line driving circuits 11 shown in FIG. 1 Scanning signals G1, G2, . . . , Gn are line-sequentially supplied to the 1 to n scanning lines 241 from the scanning line driving circuits 11.

Each of the m signal lines 242 illustrated in FIG. 3 extends in the Y2 direction, and the m signal lines 242 are arranged at equal intervals in the X1 direction. The m signal lines 242 are each electrically coupled to the sources of the corresponding plurality of transistors 24. The m signal lines 242 are electrically coupled to the signal line driving circuit 12 shown in FIG. 1 Image signals S1, S2, . . . , Sm are supplied to the 1 to m signal lines 242. from the signal line driving circuit 12 in parallel.

The n scanning lines 241 and the m signal lines 242 shown in FIG. 3 are electrically insulated from each other and are disposed in a grid pattern in plan view. An region surrounded by two adjacent scanning lines 241 and two adjacent signal lines 242 corresponds to the pixel P. Each of the pixel electrodes 23 is electrically coupled to the drain of the corresponding transistor 24.

Each of the n capacitive lines 243 extends in the X1 direction, and the n capacitor lines 243 are arranged at equal intervals in the Y2 direction. Additionally, the n capacitor lines 243 are electrically insulated with respect to the m signal lines 242 and the n scanning lines 241, and are disposed at intervals with respect to each other. A fixed potential such as a ground potential is applied to each of the capacitor lines 243. The n capacitive lines 243 are each electrically coupled to a corresponding plurality of storage capacitors 244. Each storage capacity 244 is a capacitive element for holding the potential of the pixel electrodes 23. Note that the plurality of storage capacities 244 are electrically coupled to the plurality of pixel electrodes 23 in a one-to-one manner. The plurality of storage capacitors 244 are electrically coupled to the drains of the plurality of transistors 24 in a one-to-one manner.

When the scanning signals G1, G2, . . . , Gn are sequentially activated and the n scanning lines 241 are sequentially selected, then the transistors 24 coupled to the selected scanning lines 241 are turned to be on-state. Then, the image signals S1, S2, . . . , Sm having a magnitudes corresponding to the gradation to be displayed via the m signal lines 242 are captured in the pixels P corresponding to the selected scanning lines 241, and are applied to the pixel electrodes 23. As a result, voltages corresponding to the gradation to be displayed are applied to liquid crystal capacitors formed between the pixel electrodes 23 and the common electrode 35 in FIG. 2, where the orientation of the liquid crystal molecules varies according to the applied voltages. Note that the applied voltages are held by the storage capacitors 244. Such a variation in the orientation of the liquid crystal molecules causes the light to be modulated, to thus enable gradation display.

1Ac. Specific Configuration of Electro-Optical Device 100

Figure 4:
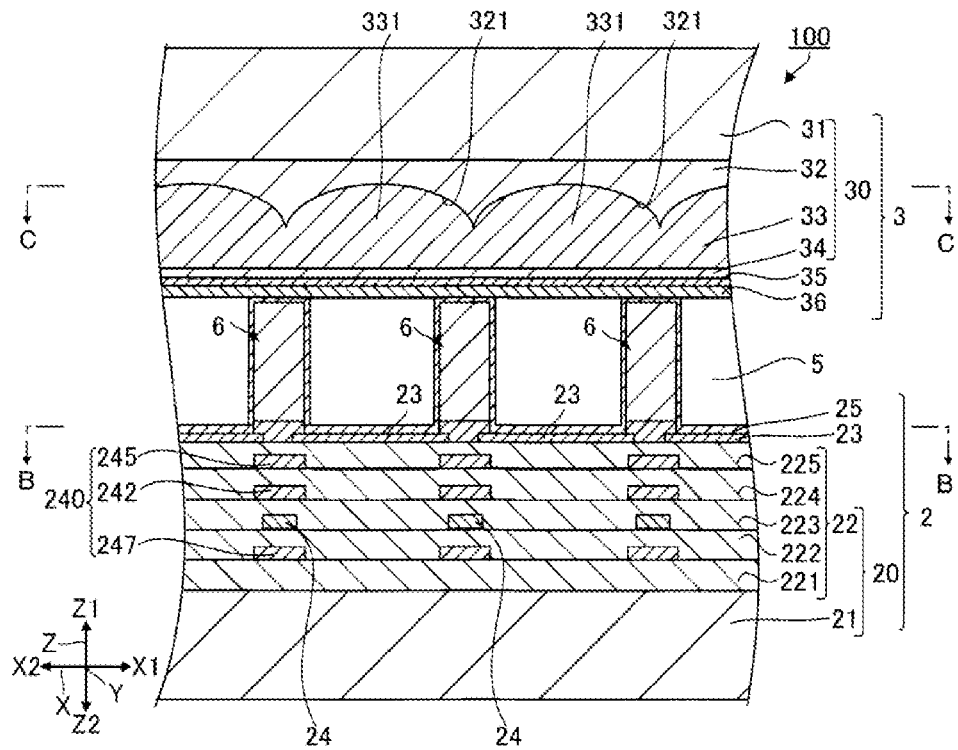
FIG. 4 is an enlarged view of a portion of the electro-optical device of FIG. 2.

FIG. 4 is an enlarged view of a portion of the electro-optical device 100 of FIG. 2. As illustrated in FIG. 4, the electro-optical device 100 includes a plurality of spacers 6 in addition to the element substrate 2, the counter substrate 3, and the liquid crystal layer 5. Next, detailed configurations of the element substrate 2, the counter substrate 3, and the liquid crystal layer 5 will be described.

1Ac-1. Element Substrate 2

As illustrated in FIG. 4, the element substrate 2 includes the first substrate 20, the plurality of pixel electrodes 23, and the first oriented film 25, as described above. The first substrate 20 includes a first base body 21, a stack body 22, a light shielding portion 240, and the transistors 24 described above. The light shielding portion 240 includes various wiring lines, etc. illustrated in FIG. 3 described above. The first base body 21, the stack body 22, the plurality of pixel electrodes 23, and the first oriented film 25 are stacked in this order in the Z1 direction. Hereinafter, the element substrate 2 will be described.

The first substrate 20 has translucency. The first base body 21 included in the first substrate 20 is a plate having translucency and insulating properties. The first base body 21 is, for example, a glass plate or a quartz plate. The stack body 22 has translucency and insulating properties. The stack body 22 includes a plurality of interlayer insulating films 221, 222, 223, 224, and 225. The interlayer insulating films 221, 222, 223, 224, and 225 are stacked in this order from the first base body 21 toward the plurality of pixel electrodes 23. The material of each layer of the stack body 22 is, for example, an inorganic material such as silicon nitride and silicon oxide.

Figure 5:
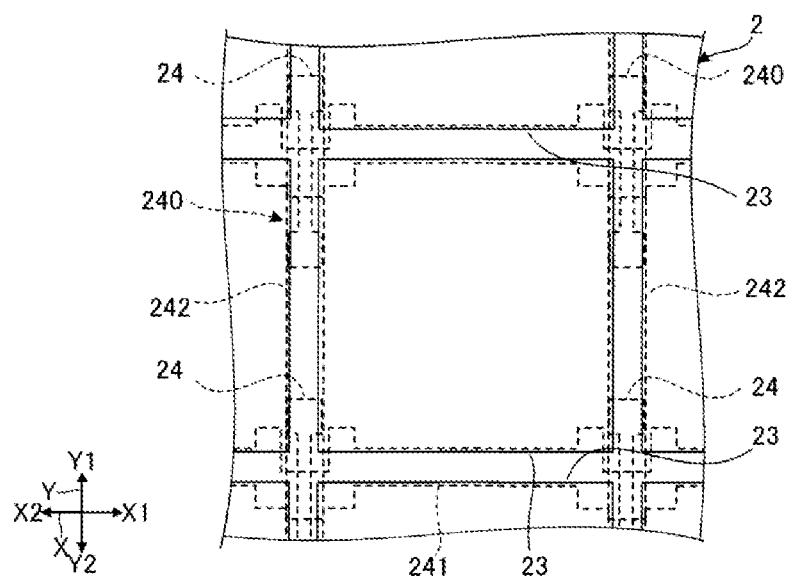
FIG. 5 is a plan view of the element substrate illustrated in FIG. 4.

The plurality of transistors 24 and the light shielding portion 240 are disposed between the layers of the stack body 22. Note that in FIG. 4, the transistors 24 and the light shielding portion 240 are schematically illustrated. As described above, the counter substrate 3 has a parting with light shielding properties that surrounds the display region A10, but there is no light shielding member in the display region A10, and an opening of the pixel P is defined as illustrated in FIG. 5 by the transistors 24 and the light shielding portion 240 of the element substrate 2.

The plurality of transistors 24 are disposed between the wiring, etc. of the light shielding portion 240 in a cross-sectional view. The transistor 24 includes, for example, a semiconductor layer having a LDD (Lightly Doped Drain) structure, a gate insulating layer, and a gate electrode.

The light shielding portion 240 is an aggregate of light shielding films including various wiring, etc. illustrated in FIG. 3 The light shielding portion 240 includes various electrodes that are coupled to various wiring or transistors 24. In FIG. 4, the signal lines 242 are illustrated representatively. In FIG. 4, a relay electrode 245 electrically coupled to the drain of the transistor 24 is illustrated as an example of the various electrodes. The light shielding portion 240 includes a plurality of light shielding films 247 to prevent light from entering the transistor 24.

The wiring, etc. included in the light shielding portion 240 is formed using, for example, a metal such as tungsten (W), titanium (Ti), chromium (Cr), iron (Fe), and aluminum (Al), metal silicide, or metal compounds.

Also, although not illustrated, the first substrate 20 may have a layer including glass such as, for example, a BSG (borosilicate glass) disposed at a surface of the stack body 22 on the pixel electrodes 23 side.

The plurality of pixel electrodes 23 are disposed between the first substrate 20 and the liquid crystal layer 5. In the present exemplary embodiment, the pixel electrodes 23 have translucency and conductivity. The pixel electrodes 23 include, for example, transparent conductive materials such as ITO (Indium Tin Oxide), IZO (Indium Zinc Oxide) and FTO (Fluorine-doped tin oxide).

The first oriented film 25 has translucency and insulating properties. The first oriented film 25 orients the liquid crystal molecules of the liquid crystal layer 5. The first oriented film 25 is disposed covering the plurality of pixel electrodes 23. Examples of the material of the first oriented film 25 include silicon oxide. Furthermore, the first oriented film 25 is an oblique vapor deposition film formed by oblique deposition. Note that the oblique deposition is a method by which the vapor deposition material is obliquely incident on the surface of the vapor deposited object such as the first substrate 20. Since the first oriented film 25 is an oblique vapor deposition film, it has a plurality of columns inclined with respect to the Z1 direction, which is the thickness direction of the liquid crystal layer 5. Each column is a columnar crystal formed by aggregation of molecules by interaction between molecules of the vapor deposition material.

FIG. 5 is a plan view of the element substrate 2 illustrated in FIG. 4. FIG. 5 is a plan view of the element substrate 2 from the liquid crystal layer 5 side corresponding to a line B-B in FIG. 4. In FIG. 5, the illustration of the first oriented film 25 is omitted. Outer edges of the pixel electrodes 23 are indicated by solid lines, and other outer edges are indicated by dashed lines. The plurality of pixel electrodes 23 are spaced apart from each other and are disposed in rows and columns in the X1 direction and the Y2 direction. The plurality of transistors 24 and the light shielding portion 240 are disposed around the plurality of pixel electrodes 23 in plan view. The light shielding portion 240 is disposed in a grid pattern in plan view. In FIG. 5, the spacer 6 or the corresponding portion is omitted.

1Ac-2. Counter Substrate 3

As illustrated in FIG. 4, the counter substrate 3 includes the second substrate 30, the common electrode 35, and the second oriented film 36, as described above. The second substrate 30 includes a second base body 31, a light-transmitting layer 32, a lens layer 33, and an insulating layer 34. The second base body 31, the light-transmitting layer 32, the lens layer 33, the insulating layer 34, the common electrode 35, and the second oriented film 36 are stacked in this order in the Z2 direction.

The second base body 31 is a plate having translucency and insulating properties. The second base body 31 is, for example, a glass plate or a quartz plate.

The light-transmitting layer 32 has translucency and insulating properties. The light-transmitting layer 32 includes a plurality of recessed portions 321. The material of the light-transmitting layer 32 is, for example, an inorganic material such as silicon nitride and silicon oxide.

The lens layer 33 has translucency and insulating properties. The lens layer 33 has a plurality of lens sections 331. The plurality of lens sections 331 are disposed in a one-to-one manner at the plurality of recessed portions 321. The lens sections 331 are protruding portions that protrude in the Z1 direction from the insulating layer 34. The lens sections 331 have curved surfaces that function as lens surfaces. The curved surface contacts a concave surface of the recessed portion 321. The material of the lens layer 33 is, for example, an inorganic material such as silicon nitride and silicon oxide.

The refractive index of the light-transmitting layer 32 and the refractive index of the lens layer 33 are different from each other. In the present exemplary embodiment, the refractive index of the light-transmitting layer 32 is less than the refractive index of the lens layer 33. Thus, the lens sections 331 focus the light incident on the second base body 31.

Additionally, the plurality of lens sections 331 are disposed corresponding to the plurality of pixel electrodes 23 in a one-to-one manner. By having such lens sections 331, the efficiency of use of light can be increased compared to a case in which the lens sections 331 are not included. Thus, the electro-optical device 100 having excellent brightness and display quality can be realized.

The insulating layer 34 has translucency and insulating properties. The material of the insulating layer 34 is, for example, an inorganic material such as silicon nitride and silicon oxide. Note that the insulating layer 34 may be omitted.

The common electrode 35 has translucency and conductivity. The common electrode 35 includes a transparent conductive material such as ITO, IZO, and FTO, for example.

The second oriented film 36 has translucency and insulating properties. The second oriented film 36 orients the liquid crystal molecules of the liquid crystal layer 5 together with the first oriented film 25. The second oriented film 36 is disposed covering the common electrode 35. Examples of the material of the second oriented film 36 include silicon oxide. Furthermore, similar to the first oriented film 25, the second oriented film 36 is an oblique vapor deposition film formed by the oblique deposition.

Figure 6:
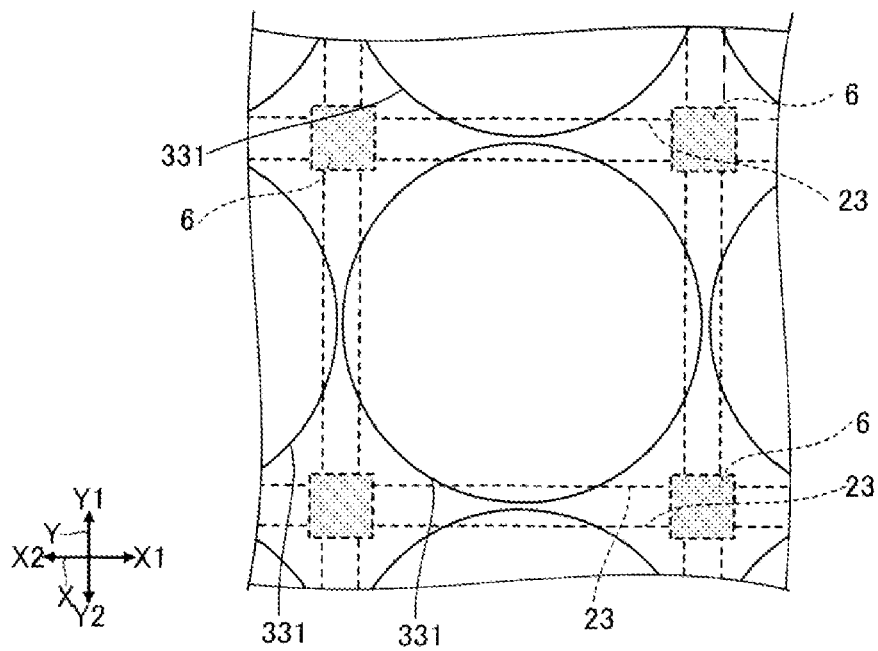
FIG. 6 is a plan view illustrating an arrangement of a lens section and a spacer in FIG. 4.

FIG. 6 is a plan view illustrating the arrangement of the lens sections 331 and the spacer 6 in FIG. 4. FIG. 6 is a plan view from the counter substrate 3 corresponding to a line C-C in FIG. 4 toward the element substrate 2, corresponding to FIG. 5. Outer edges of the lens sections 331 are indicated by solid lines, and other outer edges are indicated by dashed lines. FIG. 6 illustrates that the lens sections 331 overlap with the corresponding pixel electrodes 23 in plan view. The lens sections 331 are disposed for each pixel pitch. In addition, in FIG. 6, in plan view, the spacers 6 are disposed between the plurality of lens sections 331, and the spacers 6 are illustrated in a dot pattern for convenience. In FIG. 6, the outer edges of the lens sections 331 are indicated by circles, however, the outer edges of the lens sections 331 may be brought closer to the shape of the pixel electrodes 23 and obtain the cross-sectional shape illustrated in FIG. 4.

1Ac-3. Spacer 6

Figure 7:
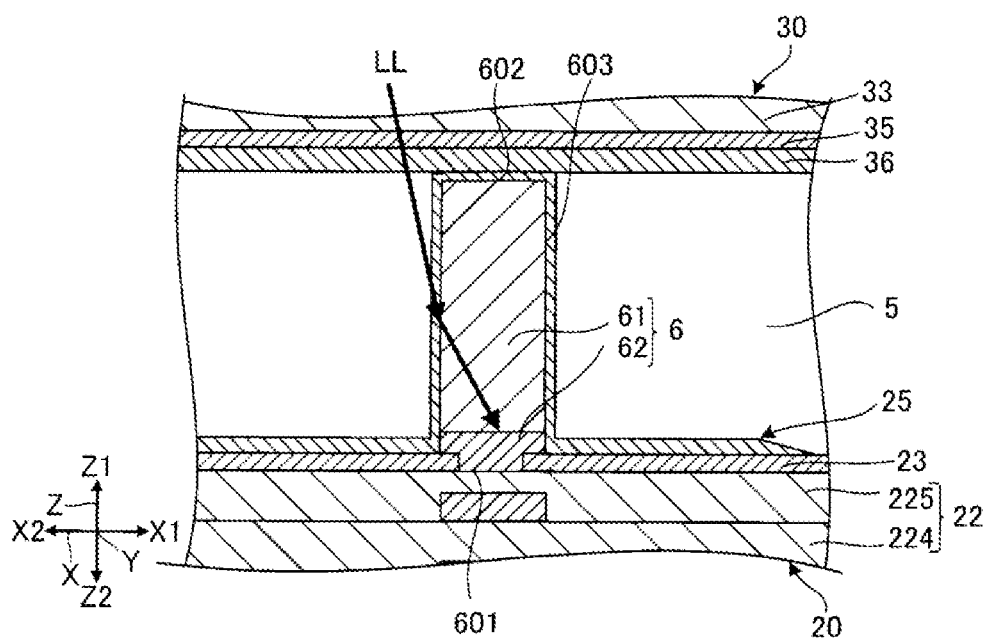
FIG. 7 is a cross-sectional view illustrating the spacer of FIG. 4.

FIG. 7 is an enlarged cross-sectional view of the spacer 6 of FIG. 4. As illustrated in FIG. 7, the plurality of spacers 6 are disposed between the first substrate 20 and the second substrate 30. Additionally, the plurality of spacers 6 are disposed within the liquid crystal layer 5. In the example illustrated in FIG. 7, the spacer 6 contacts the first substrate 20 and the pixel electrodes 23. In the present exemplary embodiment, the spacer 6 is disposed at the first substrate 20. In the example illustrated in FIG. 7, the spacer 6 is covered by the first oriented film 25, but the first oriented film 25 need not be disposed at the spacer 6. Furthermore, in order to reduce the orientation failure of the region where the first oriented film 25 is not disposed, the first oriented film 25 may be formed at the spacer 6 by multiple vapor deposition. For example, when the spacer 6 is formed at the element substrate 2, the spacer 6 is formed and disposed by patterning the inorganic material at the element substrate 2 at which up to the pixel electrodes 23 are formed as illustrated in FIGS. 4 to 7, and then the first oriented film can be formed at the pixel electrodes 23 and the surface of the spacer 6 on the liquid crystal layer 5 side by vertically and obliquely depositing the inorganic material.

Each spacer 6 is a columnar member. The spacer 6 defines a distance between the first substrate 20 and the second substrate 30. In other words, the spacer 6 defines the thickness of the liquid crystal layer 5. By having the spacer 6, changes in the distance between the first substrate 20 and the second substrate 30 over time can be suppressed compared to the case where there is no spacer 6.

The shape of each spacer 6 in a cross-sectional view is quadrangular. The spacer 6 is a columnar and has a first surface 601 corresponding to the bottom surface, a second surface 602 corresponding to the upper surface, and a side surface 603. The first surface 601 is a surface of the spacer 6 located closest to the first substrate 20. The second surface 602 is a surface of the spacer 6 located closest to the second substrate 30. The side surface 603 couples the first surface 601 and the second surface 602. In the present exemplary embodiment, the side surface 603 is parallel to the Z1 direction. The width of the first surface 601 and the width of the second surface 602 are approximately equal. The width is the length in the X-Y plane.

Note that in the example illustrated in FIG. 6, the shape of each spacer 6 in plan view is approximately square, but the shape thereof is not limited to a square shape. For example, the shape may be a polygon, such as a diamond shape and a hexagon, for example, or a circle. In the example illustrated in FIG. 6, the overall shape of each spacer 6 is cylindrical, but the overall shape may be, for example, a wall shape. In this case, the shape of the spacer 6 in plan view may be a line along the wiring of the light shielding portion 240, or may have a frame shape corresponding to the light shielding portion 240.

Additionally, as illustrated in FIG. 6, the plurality of spacers 6 are disposed in an island shape in plan view. Each spacer 6 does not overlap with the pixel electrodes 23 primarily in plan view. Specifically, each spacer 6 has a portion located in a region between the plurality of pixel electrodes 23 in plan view. By disposing the spacer 6 at such a position, the region where the spacer 6 and the pixel electrodes 23 overlap with each other in plan view can be reduced. Thus, a reduction in an opening ratio caused by the presence of the spacer 6 can be suppressed. Further, in order to prevent a decrease in the opening ratio, the proportion of the portion of the spacer 6 that overlaps with the pixel electrodes 23 is smaller than the proportion of the portion of the spacer 6 that does not overlap with the pixel electrodes 23.

Note that in the examples illustrated in FIGS. 4 to 7, each spacer 6 has a portion that overlaps with the pixel electrodes 23, but may not have such a portion.

In the present exemplary embodiment, the plurality of spacers 6 are disposed in a one-to-one manner with respect to the plurality of pixels P. However, the spacer 6 need not be disposed for each pixel P. However, by disposing the spacer 6 for each pixel P, the distance between the first substrate 20 and the second substrate 30 can be suppressed for each pixel P.

As illustrated in FIG. 7, the spacer 6 includes a high refractive index portion 61 and a light-absorbing portion 62. The high refractive index portion 61 and the light-absorbing portion 62 are coupled to each other. In the present exemplary embodiment, the high refractive index portion 61 occupies the majority of the spacer 6.

The high refractive index portion 61 has translucency and insulating properties. The refractive index of the high refractive index portion 61 is higher than the refractive index of the liquid crystal layer 5. In other words, the spacer 6 includes the high refractive index portion 61 having a refractive index greater than the refractive index of the liquid crystal layer 5.

Here, in a case where the first oriented film 25 is formed by a vapor deposition film, in some cases, depending on the formation method, when the spacer 6 is present, the film formation state of the first oriented film 25 may differ between the region of the side surface portion of the spacer 6 and the region of the pixel electrodes 23, particularly the region of the center portion of the pixel electrodes 23. As a result, it is difficult to achieve the same liquid crystal orientation between the side surface portion of the spacer 6 and the center portion of the pixel electrodes 23, thereby the orientation of the liquid crystal is easily disordered at the side surface portion of the spacer 6. As a result, there is a risk that light leakage may occur at a location where the orientation is disordered. In addition, the light leakage may increase due to the reflected light at the side surface of the spacer 6.

In the present exemplary embodiment, the high refractive index portion 61 is provided as described above. Thus, as illustrated in FIG. 7, light LL is not totally reflected by the side surface 603 of the high refractive index portion 61, and is incident on the high refractive index portion 61. Thus, the increase in the light leakage due to the total reflected light entering the location where the orientation of the liquid crystal layer 5 is disordered can be suppressed. Therefore, the light leakage can be reduced to a greater extent than before. Thus, so-called black floating in a electro-optical device can be suppressed. As a result, display quality can be improved.

The proportion of the high refractive index portion 61 of the spacer 6 is not particularly limited, but is preferably 80% or greater. By being greater than or equal to the range described above, reflection of light at the high refractive index portion 61 of the light LL can be more effectively suppressed.

The high refractive index portion 61 is located on the incident side of the light LL with respect to the light-absorbing portion 62. Thus, the light LL can be efficiently guided to the high refractive index portion 61 compared to a case in which the high refractive index portion 61 is located on the emission side of the light LL with respect to the light-absorbing portion 62. As a result, the proportion of the light LL incident on the location where the orientation of the liquid crystal layer 5 is disordered can be reduced. Therefore, an occurrence of the light leakage can be more effectively suppressed.

The difference between the refractive index of the liquid crystal layer 5 and the refractive index of the high refractive index portion 61 is not particularly limited, but is, for example, from 0.05 to 0.4. When the range is within such a range, the light LL can be efficiently guided to the high refractive index portion 61 compared to a case where it is out of the range, and the option of the material of the high refractive index portion 61 is prevented from being excessively low. In addition, the refractive index of the liquid crystal layer 5 is, for example, from 1.4 to 1.65. In this case, the refractive index of the high refractive index portion 61 is not particularly limited to as long as being greater than the refractive index of the liquid crystal layer 5, but is, for example, from 1.7 to 1.9.

Examples of the material of the high refractive index portion 61 include an inorganic material containing silicon oxide such as silicon dioxide and silicon oxynitride. When the material of the high refractive index portion 61 is an inorganic material, the dimensional accuracy of the high refractive index portion 61 can be particularly increased compared to a case in which the high refractive index portion 61 includes an organic material, and dimensional changes over time can be particularly difficult to occur. Thus, the distance between the element substrate 2 and the counter substrate 3 can be stabilized over a long period of time. In addition, when the material of the high refractive index portion 61 is an inorganic material, degradation of the liquid crystal layer 5 due to the invasion of the components of the organic material or the metal material into the liquid crystal layer 5 is suppressed. As a result, the risk of defects caused by the organic component or the metal component being mixed into the liquid crystal layer 5 can be suppressed. Thus, the life of the electro-optical device 100 can be extended.

Note that the high refractive index portion 61 may include an organic material or a metal material. The high refractive index portion 61 may be constituted by a single layer or may be constituted by a plurality of layers. However, a single layer makes it easier to manufacture the high refractive index portion 61 compared to a case in which the high refractive index portion 61 is constituted by the plurality of layers.

As illustrated in FIG. 7, the light-absorbing portion 62 is located in the Z2 direction with respect to the high refractive index portion 61. The light-absorbing portion 62 contacts the first substrate 20 and the pixel electrodes 23. Note that any film may be interposed between the light-absorbing portion 62, and the first substrate 20 and the pixel electrodes 23.

The light-absorbing portion 62 has a function of absorbing light. Thus, the light LL incident on the high refractive index portion 61 can be absorbed. Thus, the light LL is prevented from being emitted to a location where the orientation of the liquid crystal layer 5 is disordered. In addition, since the high refractive index portion 61 overlaps with the transistor 24 in plan view, the risk of the light LL incident on the high refractive index portion 61 is suppressed from being incident on the transistor 24. Note that when the light-absorbing portion 62 does not exist, the light LL incident on the high refractive index portion 61 is absorbed by the light shielding portion 240.

Examples of the material of such a light-absorbing portion 62 include a resin material including a color material, a metal material, and an inorganic material such as silicon nitride. The light-absorbing portion 62 may be constituted by a single layer or may be constituted by a plurality of layers. However, a single layer makes it easier to manufacture the light-absorbing portion 62 compared to a case in which the light-absorbing portion 62 is constituted by the plurality of layers.

The refractive index of the light-absorbing portion 62 may be the same as or different from the refractive index of the liquid crystal layer 5, but is preferably higher than the refractive index of the liquid crystal layer 5. As a result, the possibility that the light from the liquid crystal layer 5 toward the light-absorbing portion 62 is reflected by the light-absorbing portion 62 is suppressed. Accordingly, the overall refractive index of the spacer 6 is preferably higher than the refractive index of the liquid crystal layer 5. As a result, the light leakage can be particularly effectively suppressed.

By using the spacer 6 described above, the thickness of the liquid crystal layer 5 can be maintained and the light leakage can be suppressed to a greater extent than before, whereby the reduction in the display quality of the electro-optical device 100 can be suppressed.

In addition, the refractive index of the first oriented film 25 is preferably a refractive index between the refractive index of the liquid crystal layer 5 and the refractive index of the high refractive index portion 61. In addition, the refractive index of the first oriented film 25 is preferably closer to the refractive index of the high refractive index portion 61 than the refractive index of the liquid crystal layer 5. As a result, the total reflection of the light LL at the interface between the first oriented film 25 and the spacer 6 can be suppressed, whereby the light LL can be efficiently guided to the high refractive index portion 61.

As described above, the lens sections 331 are provided for each pixel pitch. The lens sections 331 focus the light in the liquid crystal layer 5. Thus, the proportion of the light LL incident on the location where the orientation of the liquid crystal layer 5 is disordered can be reduced compared to a case in which the lens sections 331 are not included. Thus, the light leakage can be suppressed compared to a case in which the lens sections 331 are not included.

1B. Second Exemplary Embodiment

A second exemplary embodiment will be described. Note that, for the elements having the same functions as those of the first exemplary embodiment in each of the following examples, the reference numerals used in the description of the first exemplary embodiment will be diverted and detailed description of each will be omitted as appropriate.

Figure 8:
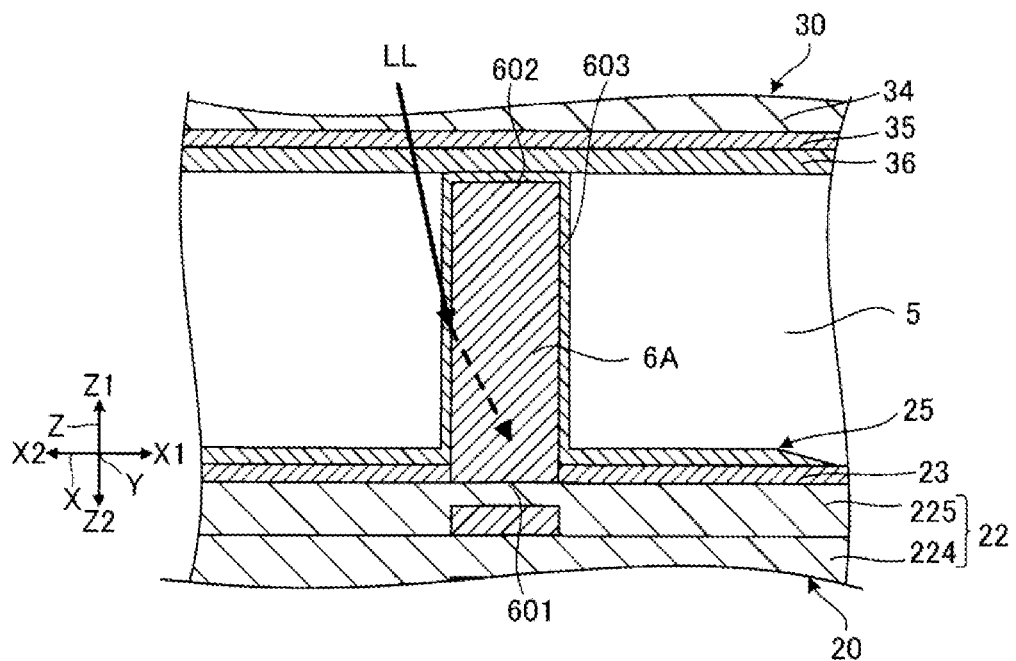
FIG. 8 is a cross-sectional view illustrating a spacer according to a second exemplary embodiment.

FIG. 8 is a cross-sectional view illustrating a spacer 6A according to the second exemplary embodiment. The spacer 6A of the present exemplary embodiment does not separately include the high refractive index portion 61 and the light-absorbing portion 62 of the first exemplary embodiment. The spacer 6A illustrated in FIG. 8 has functions of both the high refractive index portion 61 and the light-absorbing portion 62 as a whole. Hereinafter, the spacer 6A will be described with a different matter from the spacer 6 of the first exemplary embodiment, and descriptions of the same items will be omitted as appropriate.

The spacer 6A illustrated in FIG. 8 is constituted by a high refractive index portion having a refractive index greater than the refractive index of the liquid crystal layer 5. The foregoing high refractive index portion has a function of absorbing light. Since the spacer 6A has both the functions of the high refractive index portion 61 and the light-absorbing portion 62 of the first exemplary embodiment, the light LL incident on the spacer 6A is incident on the spacer 6A, and is absorbed. Note that, depending on the absorption performance of the spacer 6A, the light LL is gradually absorbed while traveling through the spacer 6A.

By having the spacer 6A, the light reflected by the spacer 6A is incident on a location where the orientation of the liquid crystal layer 5 is disordered, whereby the light leakage can be suppressed from being promoted. Additionally, the possibility of light incident on the spacer 6A being emitted to the outside of the spacer 6A is suppressed. In particular, since the entire spacer 6A has the absorption performance, the light LL can be more absorbed, whereby making it possible to further reduce the amount of the light leakage.

Examples of the material of the spacer 6A include a resin material including a color material, a metal material, and an inorganic material such as silicon nitride. Note that the spacer 6A may be constituted by a single layer or a plurality of layers. When the spacer 6A is constituted by a plurality of layers, a portion in contact with the liquid crystal layer 5 is preferably constituted by an inorganic material. As a result, the risk of defects caused by the organic component or the metal component being mixed into the liquid crystal layer 5 is suppressed.

In addition, the refractive index of the first oriented film 25 is preferably a refractive index between the refractive index of the liquid crystal layer 5 and the refractive index of the spacer 6A. In addition, the refractive index of the first oriented film 25 is preferably closer to the refractive index of the spacer 6A than the refractive index of the liquid crystal layer 5. As a result, the total reflection of the light LL at the interface between the first oriented film 25 and the spacer 6A can be suppressed, whereby the light LL can be efficiently guided to the spacer 6A.

According to the second exemplary embodiment as well, similar to the first exemplary embodiment, the light leakage can be reduced to a greater extent than before.

1C. Third Exemplary Embodiment

A third exemplary embodiment will be described. Note that, for the elements having the same functions as those of the first exemplary embodiment in each of the following examples, the reference numerals used in the description of the first exemplary embodiment will be diverted and detailed description of each will be omitted as appropriate.

Figure 9:
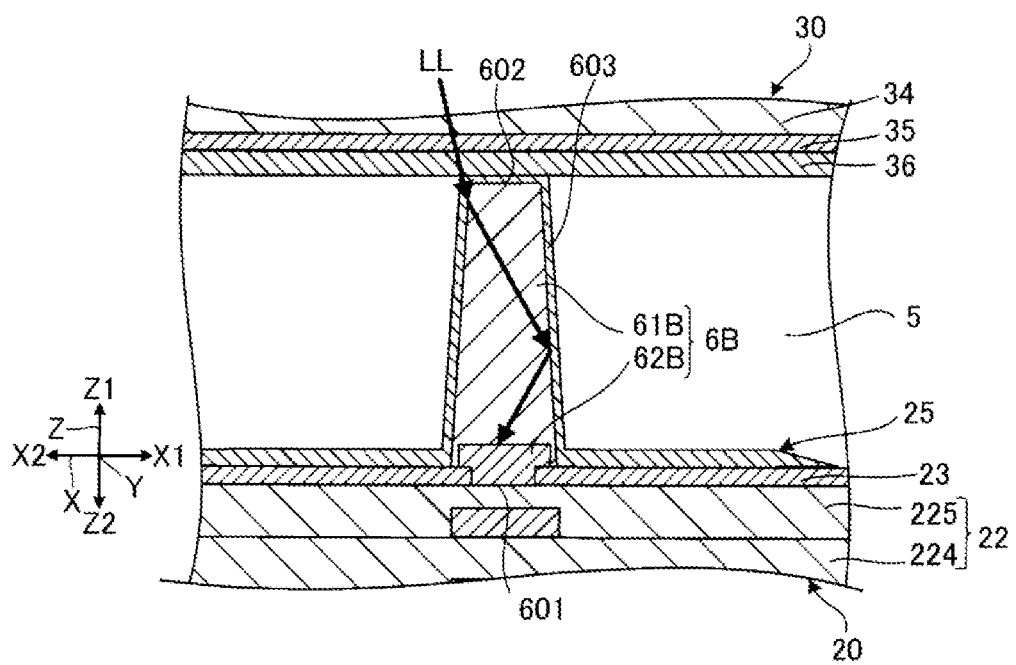
FIG. 9 is a cross-sectional view illustrating a spacer according to a third exemplary embodiment.

FIG. 9 is a cross-sectional view illustrating a spacer 6B according to the third exemplary embodiment. The spacer 6B of the present exemplary embodiment has a high refractive index portion 61B and a light-absorbing portion 62B instead of the high refractive index portion 61 and the light-absorbing portion 62 of the first exemplary embodiment. Hereinafter, the spacer 6B will be described with a different matter from the spacer 6 of the first exemplary embodiment, and descriptions of the same items will be omitted as appropriate.

As illustrated in FIG. 9, the spacer 6B has a shape such that the width thereof decreases from one of the first substrate 20 or the second substrate 30 toward the other. In the present exemplary embodiment, the spacer 6 has a shape such that the width thereof decreases from the first substrate 20 toward the second substrate 30. The shape of the spacer 6B in a cross-sectional view is trapezoidal. The shape of the high refractive index portion 61B and the light-absorbing portion 62B in a cross-sectional view is trapezoidal. In the present exemplary embodiment, the width of the second surface 602 is smaller than the width of the first surface 601. In the present exemplary embodiment, the light LL is incident from the second substrate 30. Thus, the width of the spacer 6B decreases from the emission side to the incident side of the light LL.

Due to the shape in which the width of the spacer 6B decreases from the first substrate 20 toward the second substrate 30, when the light LL is incident from the second substrate 30 as in the present exemplary embodiment, the angle of incidence of the light LL with respect to the side surface 603 can be increased in the spacer 6B. As a result, as illustrated in FIG. 9, light is more likely to propagate within the spacer 6B. Thus, the possibility of light in the spacer 6B being emitted to the outside of the spacer 6B is suppressed. Therefore, compared to the first exemplary embodiment, the light leakage can be reduced.

In addition, the light-absorbing portion 62B is covered by the high refractive index portion 61B. In other words, the light-absorbing portion 62B is disposed within the high refractive index portion 61B. Thus, even when the light-absorbing portion 62B is constituted by an organic material or a metal material, degradation of the liquid crystal layer 5 due to the invasion of the components of the organic material or the metal material into the liquid crystal layer 5 is suppressed.

According to the third exemplary embodiment as well, similar to the first exemplary embodiment, the light leakage can be reduced to a greater extent than before.

1D. Fourth Exemplary Embodiment

A fourth exemplary embodiment will be described. Note that, for the elements having the same functions as those of the first exemplary embodiment in each of the following examples, the reference numerals used in the description of the first exemplary embodiment will be diverted and detailed description of each will be omitted as appropriate.

Figure 10:
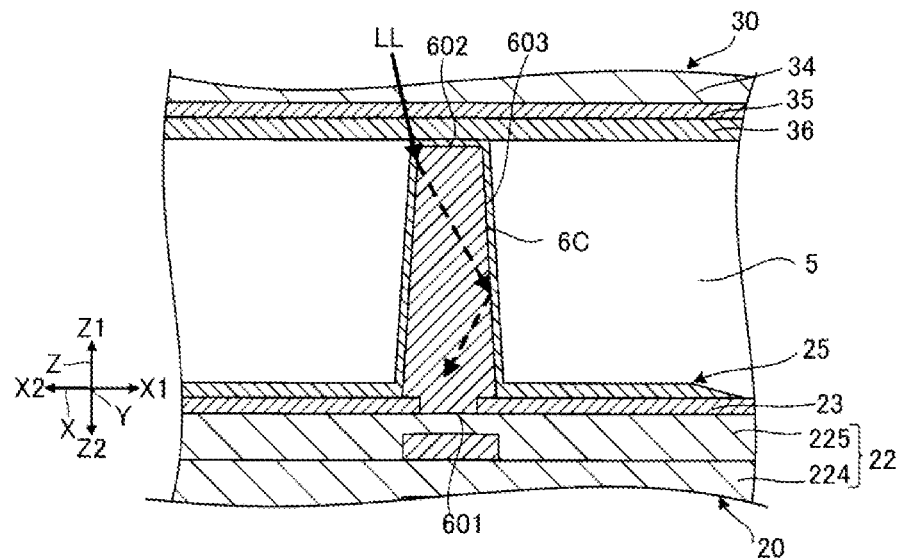
FIG. 10 is a cross-sectional view illustrating a spacer according to a fourth exemplary embodiment.

FIG. 10 is a cross-sectional view illustrating a spacer 6C according to the fourth exemplary embodiment. The spacer 6C of the present exemplary embodiment does not include the high refractive index portion 61 and the light-absorbing portion 62 of the first exemplary embodiment. Furthermore, the shape of the spacer 6C differs from the shape of the spacer 6 of the first exemplary embodiment. Hereinafter, the spacer 6C will be described with a different matter from the spacer 6 of the first exemplary embodiment, and descriptions of the same items will be omitted as appropriate.

As with the spacer 6A of the second exemplary embodiment, the spacer 6C illustrated in FIG. 10 is constituted by a high refractive index portion having a refractive index higher than the refractive index of the liquid crystal layer 5. The foregoing high refractive index portion has a function of absorbing light. Thus, the light LL incident on the spacer 6C is incident on the spacer 6C and absorbed.

By having the spacer 6C, the light LL reflected by the spacer 6C is incident on a location where the orientation of the liquid crystal layer 5 is disordered, whereby the light leakage can be suppressed from being promoted. In addition, the possibility of light incident on the spacer 6C being emitted to the outside of the spacer 6C is suppressed. In particular, since the entire spacer 6A has the absorption performance, the light LL can be more absorbed, whereby making it possible to further reduce the amount of the light leakage.

As with the spacer 6A of the second exemplary embodiment, examples of the material of the spacer 6C include a resin material including a color material, a metal material, and an inorganic material such as silicon nitride.

As illustrated in FIG. 10, similar to the spacer 6B of the third exemplary embodiment, the spacer 6C has a shape such that the width thereof decreases from one of the first substrate 20 or the second substrate 30 toward the other. In the present exemplary embodiment, the spacer 6C has a shape such that the width thereof decreases from the first substrate 20 toward the second substrate 30. The shape of the spacer 6C in a cross-sectional view is trapezoidal. The width of the second surface 602 is smaller than the width of the first surface 601. Additionally, the width of the spacer 6C decreases from the emission side to the incident side of the light LL.

Due to the shape in which the width of the spacer 6C decreases from the first substrate 20 toward the second substrate 30, when the light LL is incident from the second substrate 30, the angle of incidence of the light LL with respect to the side surface 603 can be increased in the spacer 60. As a result, as illustrated in FIG. 10, the light LL is more likely to propagate within the spacer 6C. Thus, the possibility of the light LL in the spacer 6C being emitted to the outside of the spacer 6C is suppressed. Therefore, compared to the first exemplary embodiment, the light leakage can be reduced.

According to the fourth exemplary embodiment as well, similar to the first exemplary embodiment, the light leakage can be reduced to a greater extent than before.

1E. Fifth Exemplary Embodiment

A fifth exemplary embodiment will be described. Note that, for the elements having the same functions as those of the first exemplary embodiment in each of the following examples, the reference numerals used in the description of the first exemplary embodiment will be diverted and detailed description of each will be omitted as appropriate.

Figure 11:
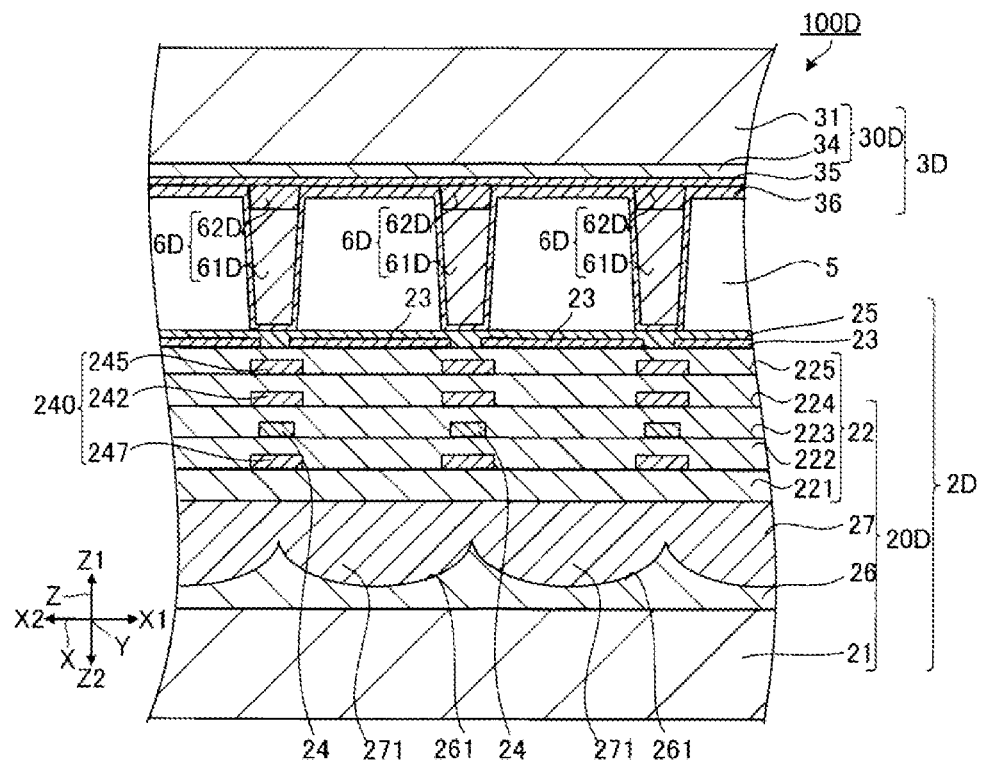
FIG. 11 is a cross-sectional view illustrating an electro-optical device according to a fifth exemplary embodiment.

FIG. 11 is a cross-sectional view illustrating an electro-optical device 100D according to the fifth exemplary embodiment. The electro-optical device 100D of the present exemplary embodiment includes an element substrate 2D, an counter substrate 3D, and a plurality of spacers 6D in place of the element substrate 2, the counter substrate 3, and the plurality of spacers 6 of the first exemplary embodiment. In the following, the element substrate 2D, the counter substrate 3D, and the plurality of spacers 6D will be described with respect to the element substrate 2, the counter substrate 3, and the plurality of spacers 6 of the first exemplary embodiment, and descriptions of the same items will be omitted as appropriate.

In the electro-optical device 100D illustrated in FIG. 11, light is incident from the element substrate 2D, and light is emitted from the counter substrate 3D.

As illustrated in FIG. 11, a first substrate 20D of the element substrate 2D further includes a light-transmitting layer 26 and a lens layer 27. The first substrate 20, the light-transmitting layer 26, the lens layer 27, and the stack body 22 are stacked in this order in the Z1 direction.

The light-transmitting layer 26 has translucency and insulating properties. The light-transmitting layer 26 includes a plurality of recessed portions 261. The material of the light-transmitting layer 26 is, for example, an inorganic material such as silicon nitride and silicon oxide.

The lens layer 27 has translucency and insulating properties. The lens layer 27 has a plurality of lens sections 271. The plurality of lens sections 271 are disposed in a one-to-one manner at the plurality of recessed portions 261. The lens sections 271 are protruding portions that protrude in the Z2 direction from the stack body 22. The lens sections 271 have curved surfaces that function as lens surfaces. The curved surface contacts a concave surface of the recessed portion 261. The material of the lens layer 27 is, for example, an inorganic material such as silicon nitride and silicon oxide.

The refractive index of the light-transmitting layer 26 and the refractive index of the lens layer 27 are different from each other. In the present exemplary embodiment, the refractive index of the light-transmitting layer 26 is greater than the refractive index of the lens layer 27. Thus, the lens sections 271 focus the light incident on the first base body 21.

The plurality of lens sections 271 correspond to the plurality of pixel electrodes 23 in a one-to-one manner. By having such lens sections 271, the efficiency of use of light can be increased compared to a case in which the lens sections 271 are not included. Thus, the electro-optical device 100 having excellent brightness and display quality can be realized. In addition, by having the lens sections 271, the proportion of the light LL incident on the location where the orientation of the liquid crystal layer 5 is disordered can be reduced. Therefore, the light leakage can be suppressed.

As illustrated in FIG. 11, the light-transmitting layer 32 and the lens layer 33 of the first exemplary embodiment are omitted in the counter substrate 3D. Thus, the second substrate 30D of the counter substrate 3D has the second base body 31 and the insulating layer 34. The first substrate 20D has the lens layer 27 and the second substrate 30D does not have the lens layer as in the present exemplary embodiment, whereby the second substrate 30D can be simplified.

In the example illustrated in FIG. 11, the spacer 6D is the same as the spacer 6B of the third exemplary embodiment, except that the spacer 6D is disposed at the second substrate 30 via the common electrode 35. Also, a portion of the spacer 6D is covered by the second oriented film 36, but the second oriented film 36 need not be disposed at the spacer 6D.

As illustrated in FIG. 11, the spacer 6D has a shape such that the width thereof is decreases from the second substrate 30D toward the first substrate 20D. The shape of the high refractive index portion 61D and the light-absorbing portion 62D in a cross-sectional view is trapezoidal. In the present exemplary embodiment, the width of the first surface 601 is smaller than the width of the second surface 602. Additionally, the width of the spacer 6D decreases from the emission side to the incident side of the light LL.

Due to the shape in which the width of the spacer 6D decreases from the second substrate 30D toward the first substrate 20D, when light is incident from the first substrate 20D, the angle of incidence of the light with respect to the side surface 603 can be increased in the spacer 6D. As a result, the possibility of light in the spacer 6D being emitted to the outside of the spacer 6D is suppressed. Thus, the light leakage can be reduced.

According to the fifth exemplary embodiment as well, similar to the first exemplary embodiment, the light leakage can be reduced to a greater extent than before.

Note that the shape of the spacer 6D in a cross-sectional view is not trapezoidal, but may have a quadrangular shape similar to that of the spacer 6 of the first exemplary embodiment. Additionally, similar to the second and fourth exemplary embodiments, the spacer 6D may be constituted by a low refractive index portion having a refractive index less than that of the liquid crystal layer 5, and may also have a function of absorbing light.

2. Modification Example

Each of the embodiments exemplified above can be variously modified. Specific modification aspects applied to each of the embodiments described above are exemplified below. Two or more modes freely selected from exemplifications below can be appropriately used in combination as long as mutual contradiction does not arise. Modification examples on the first exemplary embodiment that follow may be adapted to other exemplary embodiments to the extent that they do not conflict.

In each of the above-described exemplary embodiments, the transistor 24 is a TFT, but may be, for example, a MOSFET (metal-oxide-semiconductor field-effect transistor).

In the embodiments described above, the active matrix type electro-optical device 100 is illustrated, but without being limited thereto, the driving method of the electro-optical device 100 may be a passive matrix method, etc., for example.

The driving method of the "electro-optical device" is not limited to a vertical electric field method, and may be a lateral electric field method. In the first exemplary embodiment, the pixel electrodes 23 are provided at the element substrate 2, and the common electrode 35 is provided at the counter substrate 3. However, an electrode for applying an electric field to the liquid crystal layer 5 may be provided at only one of the element substrate 2 and the counter substrate 3. Examples of the lateral electric field method include an IPS (In Plane Switching) mode. Furthermore, examples of the vertical electric field method include a TN (Twisted Nematic) mode, a VA (Vertical Alignment), a PVA mode, and an OCB (Optically Compensated Bend) mode.

3. Electronic Apparatus

The electro-optical device 100 can be used in various electronic apparatuses.

Figure 12:
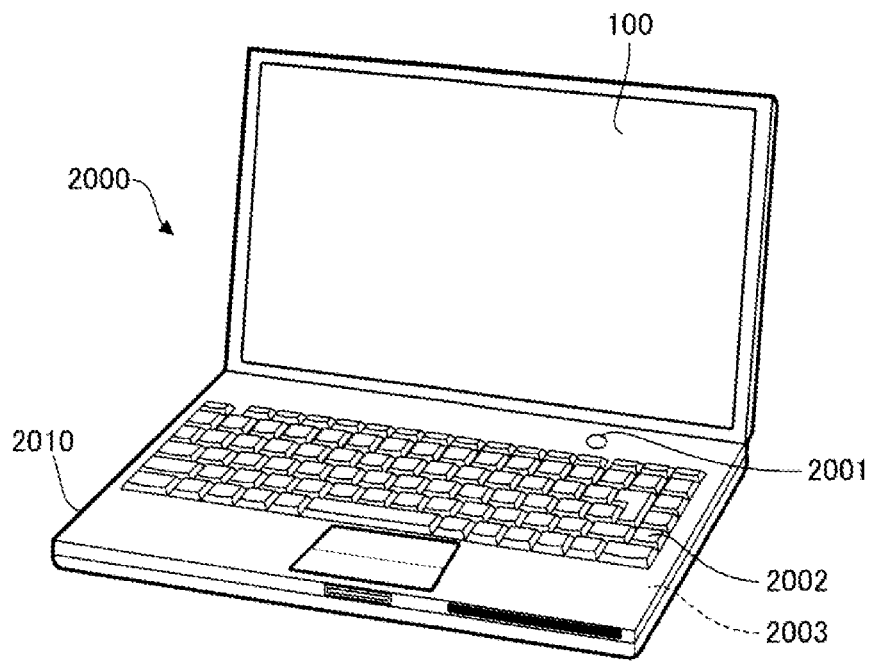
FIG. 12 is a perspective view illustrating a personal computer as an example of an electronic apparatus.

FIG. 12 is a perspective view illustrating a personal computer 2000 as an example of the electronic apparatus. The personal computer 2000 includes the electro-optical device 100 configured to display various images, and a main body portion 2010 at which a power source switch 2001 and a keyboard 2002 are installed, and a control unit 2003. The control unit 2003 includes a processor and a memory, for example, to control the operation of the electro-optical device 100.

Figure 13:
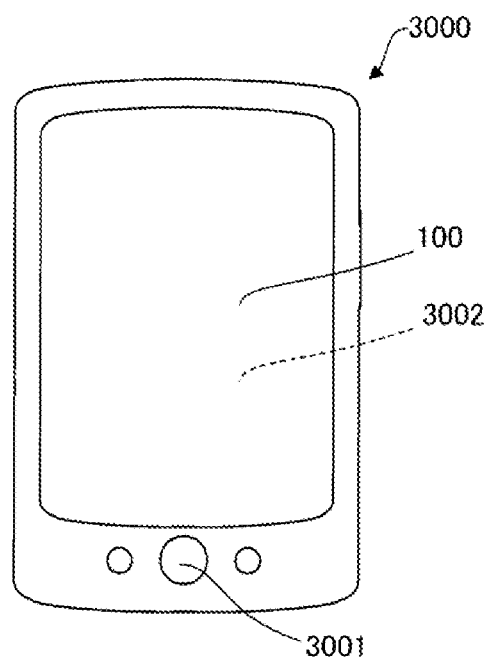
FIG. 13 is a plan view illustrating a smartphone as an example of the electronic apparatus.

FIG. 13 is a plan view illustrating a smartphone 3000 as an example of the electronic apparatus. The smartphone 3000 includes an operating button 3001, the electro-optical device 100 that displays various images, and a control unit 3002. The screen content displayed on the electro-optical device 100 is changed in accordance with the operation of the operation button 3001. The control unit 3002 includes a processor and a memory, for example, to control the operation of the electro-optical device 100.

Figure 14:
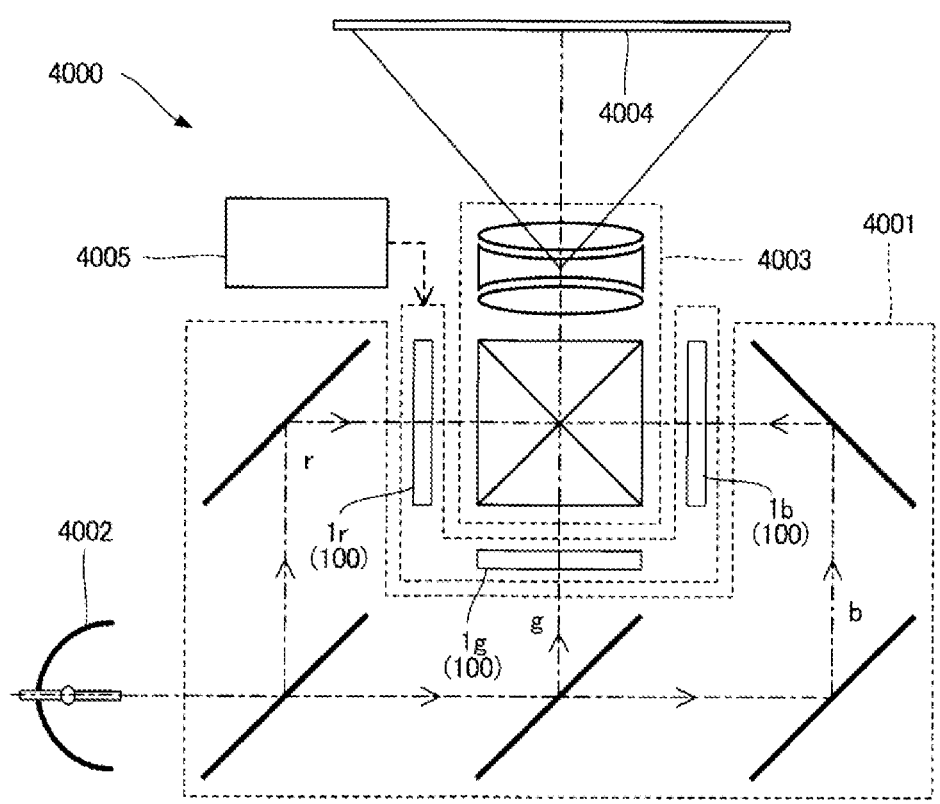
FIG. 14 is a schematic view illustrating a projector which is an example of the electronic apparatus.

FIG. 14 is a schematic view illustrating a projector which is an example of the electronic apparatus. The projection-type display apparatus 4000 is a three-plate type projector, for example. An electro-optical device 1r illustrated is the electro-optical device 100 corresponding to a red display color, an electro-optical device 1g is the optical device 100 corresponding to a green display color, and an electro-optical device 1b is the electro-optical device 100 corresponding to a blue display color. Specifically, the projection-type display apparatus 4000 includes three electro-optical devices 1r, 1g, and 1b that respectively correspond to display colors of red, green, and blue. The control unit 4005 includes a processor and a memory, for example, to control the operation of the electro-optical device 100.

An illumination optical system 4001 supplies a red component r of light emitted from an illumination apparatus 4002 as a light source to the electro-optical device 1r, a green component g of the light to the electro-optical device 1g, and a blue component b of the light to the electro-optical device 1b. Each of the electro-optical devices 1r, 1g, and 1b functions as an optical modulator, such as a light bulb, that modulates respective rays of the monochromatic light supplied from the illumination optical system 4001 depending on display images. A projection optical system 4003 combines the rays of the light emitted from each of the electro-optical devices 1r, 1g, and 1b to project the combined light to a projection surface 4004.

The foregoing electronic apparatus includes the above-described electro-optical device 100 and the control units 2003, 3002, or 4005. Since the light leakage is suppressed in the electro-optical device 100, so-called black floating is reduced. Accordingly, the display quality of the personal computer 2000, the smartphone 3000, or the projection-type display apparatus 4000 can be increased by providing the electro-optical device 100. Note that the electro-optical device 100D may be used instead of the electro-optical device 100. Even when the electro-optical device 100D is used, the same effects as when using the electro-optical device 100 are exhibited.

Note that the electronic apparatus to which the electro-optical device of the present disclosure is applied is not limited to the exemplified apparatuses, and examples thereof include a PDA (Personal Digital Assistants), a digital still camera, a television, a video camera, a car navigation device, an in-vehicle display, an electronic organizer, an electronic paper, a calculator, a word processor, a workstation, a videophone, and a POS (Point of sale) terminal, etc. Further, examples of the electronic apparatus to which the present disclosure is applied include a printer, a scanner, a copier, a video player, a device provided with a touch panel, etc.

Although the present disclosure has been described above based on the preferred exemplary embodiments, the present disclosure is not limited to the above-described exemplary embodiments. In addition, the configuration of each component of the present disclosure may be replaced with any configuration that exerts the equivalent functions of the above-described embodiments, and to which any configuration may be added.

In the above description, the liquid crystal device is described as an example of the electro-optical device of the present disclosure, but the electro-optical device of the present disclosure is not limited thereto. For example, the electro-optical device of the present disclosure can also be applied to an image sensor, etc. Further, for example, the present disclosure can be applied to a display panel using a light emitting element such as an organic EL (electro luminescence), an inorganic EL, or a light emitting polymer in the same manner as in the above-described exemplary embodiment. Further, the present disclosure can be applied to an electrophoresis display panel using microcapsules containing a colored liquid and white particles dispersed in the liquid in the same manner as in the above-described exemplary embodiment.

What is claimed is:

1. An electro-optical device comprising:
   a first substrate including a plurality of pixel electrodes;
   a second substrate having translucency;
   an electro-optical layer disposed between the first substrate and the second substrate, the electro-optical layer having an optical property that varies in accordance with an electric field generated by the plurality of pixel electrodes; and
   a spacer disposed between the first substrate and the second substrate, the spacer including a high refractive index portion having a refractive index greater than a refractive index of the electro-optical layer and having a light-absorbing portion configured to absorb light, the spacer being configured to define a distance between the first substrate and the second substrate, wherein the high refractive index portion and the light-absorbing portion are coupled to each other, and the light-absorbing portion is in contact with the plurality of pixel electrodes that are adjacent thereto.

2. The electro-optical device according to claim 1, wherein
   the spacer has a shape such that a width of the spacer decreases from one of the first substrate or the second substrate toward the other.

3. The electro-optical device according to claim 2, wherein
   the spacer includes a portion located in a region between the plurality of pixel electrodes that are separated from each other in plan view.

4. The electro-optical device according to claim 1, wherein
   the first substrate or the second substrate further includes a lens layer including a plurality of lens sections corresponding to the plurality of pixel electrodes.

5. An electronic apparatus comprising:
   the electro-optical device according to claim 1; and
   a control unit configured to control operation of the electro-optical device.

6. The electro-optical device according to claim 1, further comprising:
   a transistor including a semiconductor layer and a gate electrode, the gate electrode having a first protruding portion and a second protruding portion protruding from the gate electrode toward a source drain region of the semiconductor layer along the semiconductor layer in plan view, wherein the spacer overlaps the semiconductor layer and a portion between the first protruding portion and the second protruding portion in plan view.

* * * * *